Patented Mar. 30, 1937

2,075,343

UNITED STATES PATENT OFFICE 2,075,343

SYNTHETIC RESINS

George De Witt Graves, Wilmington, Del., assignor to E. I. du Pont de Nemours & Company, Wilmington, Del., a corporation of Delaware No Drawing. Application April 3, 1936, Serial No. 72,643

8 Claims. (Cl. 260—2)

This invention relates to new compositions of matter, and more particularly to synthetic resins of improved properties.

In application Serial Number 651,634, filed January 13, 1933 by James A. Arvin, and in my application Serial Number 14,517 filed April 23, 1935, there is disclosed a new type of resin formed by reacting a substantially unpolymerizable polyhydric phenol and an organic polyhalide whose halogen atoms are all attached to different aliphatic carbon atoms which in turn are joined to other atoms by single bonds only.

The present invention is concerned with a method of treating resins of the kind just referred to, which I shall refer to for convenience as "polyether resins", whereby new resinous compositions are produced which possess certain additional valuable properties.

This invention has as an object the preparation of new and useful compositions of matter. A further object is the preparation of polyether resins having greater toughness and flexibility than the original polyether resins from which they are derived. A further object is a new process for producing polyether resins which blend readily with other film-forming substances. Other objects will appear hereinafter.

The polyether resins used as starting materials in the present invention are made as disclosed in the above mentioned applications by reacting a substantially unpolymerizable phenol and an organic polyhalide whose halogen atoms are all attached to carbon atoms which are in turn attached to other carbon atoms solely through single bonds. The mentioned unpolymerizable phenols exclude the phenol alcohols resulting from the condensation of phenols and formaldehyde since such phenols themselves are converted to infusible, insoluble bodies upon heat treatment whereas the resins which are employed in the present invention must be produced through the interaction of an unpolymerizable phenol and a polyhalide of the mentioned class.

The preferred general method for making the polyether resins which form the starting material for the new resins claimed herein is as follows: The polyhydric phenol is mixed with an aqueous solution of the theoretical or a slightly excess quantity of concentrated aqueous alkali and heated at a relatively high temperature, above 70° C. and preferably above 100° C., but below the decomposition temperatures of the ingredients, with a substantially chemically equivalent amount of the polyhalide. The apparatus preferably consists of a vessel fitted with a thermometer, reflux condenser, and a stirrer designed to sweep the sides and bottom of the vessel. Heating is continued until the desired state of condensation is obtained or until as much of the phenol and halide are reacted as possible. The phenol is largely reacted when the amount of acid to neutralize a definite weight sample becomes essentially constant; where the theoretical amount of alkali was used originally, the final product is nearly neutral. When the halide is volatile, tests can be made for uncombined halide by distilling a few drops from the reaction vessel. If the distillate is cloudy, some of the halide is uncombined and refluxing is continued. When the distillate is clear, the water can be distilled off without loss of halide; this will then permit the removal of the reflux and the use of higher temperatures in the later stages of the reaction with a resultant decrease in time of preparation. Further heating after the distillate becomes clear is generally necessary inasmuch as this "clear" point only shows that essentially all the halide has been combined by the elimination of at least one of its halogen atoms, but not necessarily all of them. The final reaction mass is very viscous, also opaque because of occluded salt. When it has reached the desired consistency, the hot mass is poured into a steam-jacketed Werner-Pfleiderer type mixer and washed with small portions of dilute hydrochloric acid and finally with water to remove the salt. The resin is then dried, either in vacuo or at atmospheric pressure, for several hours at temperatures above its melting point, e. g., in the range 100–150° C. Clear, tough resins are obtained whose hardness will depend largely on the temperature, time of reaction, and certain other details.

The objects of the present invention are accomplished by heating the resins produced as described above in the presence of an inert solvent, and under anhydrous conditions, with a relatively small amount of a selected type of polyhalide which is different in character from the polyhalide from which the polyether resin is made. The polyhalides used in the present invention contain an ether oxygen atom and are defined as organic compounds containing two or more halogen atoms attached to different carbon atoms which are in turn attached directly to an ether oxygen atom. A suitable polyhalide of this kind is 2,3-dichloro-1,4-dioxan which has the formula

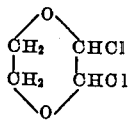

When the desired degree of reaction between the resin and the polyhalogen ether has been accomplished (as indicated by increase in viscosity of the reaction mixture), the mixture is cooled and the resin precipitated by pouring the reaction mixture into ethanol or other suitable non-solvent for the treated resin. The precipitated resin is then washed and dried. Alternatively, the resin may be isolated from the reaction mixture by evaporating off the solvent in vacuo, although this method is less desirable.

It is to be observed that in the present invention the polyether resin is treated only after it is completely formed; the amount of polyhalogen ether used in the after-treatment must be very much smaller than the amount of halide used to make the initial resin in order to prevent formation of insoluble products; the after-treatment must be carried out under anhydrous conditions because of the susceptibility of the polyhalogen ether to hydrolysis; the halogen atoms of the polyhalogen ether used in the after-treatment are attached to carbons which are in turn joined to ether oxygen, whereas the halogen atoms of the polyhalide used to make the initial polyether resin are attached to carbon atoms which are in turn joined to other carbon atoms. Halides containing the structure X—C—O—, X being halogen and O being ether oxygen, are capable of combining rapidly with the relatively few and difficultly reactive free hydroxyl groups in the preformed resin, whereas additional amounts of the halides from which the initial resin is prepared are not sure to react with the preformed resin to any appreciable degree. This suggests that in the present invention a reaction different in kind from the ether resin-forming reaction may take place; however its character is not at present known.

The following is a method of preparing an ether resin which may be treated by my new process:

*Resin A*

|  | Parts |
|---|---|
| Di(4 - hydroxyphenyl) dimethylmethane (M. P. 157° C.) | 456 |
| Dichlorodiethyl ether | 286 |
| Water | 450 |
| Sodium hydroxide (50%) | 326 |

The above mixture is refluxed in an atmosphere of nitrogen for 10–15 hours with stirring or until a few drops of clear distillate shows that there is no remaining free halide. The water is distilled off over a period of two hours, the temperature finally being carried to 225–230° C. and maintained at this point for 12 hours. The mass is very viscous and pasty. It is poured while hot into a steam-jacketed Werner-Pfleiderer mixer, washed three times with water, then with small portions of dilute hydrochloric acid until the washings are acid to Congo red and finally with water again until the washings are substantially free of chloride ion. The resulting resin is then dried by heating in vacuo at 120–125° C. for 16 hours.

The following is an instance of another polyether resin which may be treated in accordance with the process of the present invention:

*Resin B*

|  | Parts |
|---|---|
| (A) 2,2-bis-(4-hydroxyphenyl) naphthane | 70.0 |
| (B) β,β'-dichlorodiethyl ether | 31.3 |
| (C) Sodium hydroxide (48.3% solution) | 36.7 |
| (D) Water | 50.0 |

Ingredients (A), (C) and (D) are placed in the order named in a reaction vessel, and heated to refluxing temperature with stirring. Ingredient (B) is then added slowly and refluxing continued for 17.5 hours, at the end of which time a few drops are distilled and found to be clear. Water is then distilled off over a period of 1.5 hours, the temperature meanwhile being carried to 225° C. where it is held for 3.5 hours with stirring. The resin is cooled, broken into small pieces, and dissolved in toluene. The solution is filtered, the filtrate neutralized with dilute hydrochloric acid and then washed free of chlorides with hot water. The solid resin is recovered by distillation of the solvent. The product obtained has a softening point of 115–130° C. and has no tendency to be converted on heating to an infusible, insoluble product.

Polyether resins suitable for use in the present invention may also be prepared by any other method given in the mentioned co-pending applications, or they may be made by reacting the alkali metal salt of the polyhydric phenol with an aryl sulfonate of a polyhydric alcohol, for example diethylene glycol di-p-toluene sulfonate.

The following examples, in which the parts given are by weight, illustrate methods used in carrying out my invention:

*Example I*

A mixture of 100 parts of Resin A described above was dissolved in a mixture of 100 parts of xylene and one part of 2,3-dichloro-1,4-dioxane. This solution, which had a viscosity of 55 poises at 25° C., was heated to reflux for one hour. A sample of the product, on being cooled to 25° C., was found to have a viscosity of 664 poises. The resin was separated by diluting the solution with toluene to reduce its viscosity to a convenient degree, then pouring into 95% ethanol with stirring. The precipitated resin was washed several times with 95% ethanol and was then heated in vacuo 30 hours at approximately 100° C. to remove residual solvent. Films of this resin were still soluble in toluene after heating for 18 hours at 90° C.

As compared to the original resin, the product of this example is improved in toughness and flexibility to a remarkable degree. Self-supporting films of the treated resin, after complete removal of solvent and conditioning at 25° C. and 50% relative humidity for 24 hours, can be flexed sharply for 211 times whereas a correspondingly prepared and conditioned film of the untreated resin can be flexed only about 100 times.

As shown by the following example, extremely high degrees of polymerization resulting in very high viscosities are readily obtained by using slightly greater proportions of the polyhalogen ether and by continuing the treatment for somewhat longer periods.

Example II

A mixture of 55 parts of Resin B was dissolved in 160 parts of toluol and one part of 2,3-dichloro-1,4-dioxane. This solution, which had a viscosity of 23 poises, was heated to reflux for approximately 4 hours. After cooling to the same temperature under which the viscosity of the original solution was measured, the final solution was so viscous that it would barely flow, the bubble in the viscosity measuring tube not moving appreciably after five minutes.

The polyhalogen ethers used in the present after-treatment of a polyether resin are, as previously stated, organic compounds containing at least two halogen atoms attached to different carbon atoms which are in turn attached to an ether oxygen atom. The carbon atoms to which the halogens are joined may be attached to the same ether oxygen atom as in the case of di(chloromethyl) ether, $\alpha,\alpha'$-dichlorodiethyl ether, and 2,6-dichloro-1,4-dioxane, or they may be attached to different ether oxygen atoms, as in the case of di(chloromethyl) ether of glycol, the tri(chloromethyl) ether of glycerine, 2,3-dichloro-1,4-dioxane, and p-di(chloromethyoxy)-benzene. The halogen may be chlorine, bromine, or iodine, but chloroethers are preferred because of their relative cheapness and availability. The ethers may contain additional halogen atoms as well, and such additional halogens may be in any position in the ether molecule.

Polyhalogen ethers in which the halogens are attached to carbon atoms adjacent to ether oxygen are much more reactive than such ethers in which the halogens are attached to carbon atoms which are farther removed from the ether oxygen or oxygens. For example, alpha, alpha'-dichlorodiethyl ether is more reactive than beta, beta'-dichlorodiethyl ether. Polyhalogen ethers of the type exemplified by the latter compound are far less reactive toward free phenolic hydroxyl groups than toward compounds in which the hydrogen of the phenolic hydroxyl groups has been replaced with an alkali metal. This invention is limited, therefore, to the use of polyhalogen ethers in which the halogen atoms are attached to different carbon atoms which are adjacent to the same or to different ether oxygen atoms. This restriction is an important distinction between this invention and those of the related applications.

The relative proportions of the reactants can be varied considerably, depending upon the reactants employed, the reaction time and temperature, and the degree of reaction desired. The proportions of halogen-containing ether used will ordinarily be smaller when the reaction temperatures are relatively high, and vice versa. Similarly, smaller proportions of the halogen-containing ether can be used when the reaction mixture is to be heated for a relatively long time and vice versa. The use of a relatively high proportion of the halogen-containing ether in conjunction with either relatively high reaction temperatures or prolonged heating will ordinarily result in a useless, insoluble product. In fact, prolonged heating even at relatively low reaction temperatures and in the presence of only relatively small proportions of the halogen-containing ether may result in insoluble or difficultly soluble products. It is therefore necessary to preserve a balance between the variable factors, reaction temperature, time of heating, and amount of polyhalogen ether. The preferred conditions are set forth in the examples, but it may be necessary to depart somewhat from these conditions when different reactants are employed. As a general principle, it may be stated that the temperatures usually are within 50° C. to 200° C., that the amount of polyhalogen ether should range from 0.1% to 5.0% (based upon the weight of the original polyether resin), and that the time of heating should be from 0.5 hour to 8 hours. The proper balance of these factors in order to produce a useful soluble product will be apparent to those skilled in the art.

Any non-reactive solvent in which the reactants are soluble can be used in place of the xylene or toluol of the examples, e. g., other aromatic solvents such as benzene, mesitylene, cymene, or chlorinated solvents such as dichloroethylene and carbon tetrachloride. In some cases, it may be even desirable to dispense with solvent altogether.

It is apparent from the examples and other disclosures given herein that modified polyether resins can be prepared by the process described herein varying in toughness, flexibility, solution viscosity, etc., all the way from the original resins to resins which are insoluble.

My new resins, alone or in combination with cellulose derivatives, fatty oils, waxes, pigments, solvents, etc., are useful as coating compositions for a variety of surfaces such as wood, metal, glass, stone, brick, cement, concrete, paper, textiles, and leather; as adhesives for wood, especially in making plywood, or for laminating paper, glass, metals, textiles, etc.; and as molding compositions. The resins described herein also may be cast into self-supporting, thin, transparent, flexible sheets, which are of value for wrapping and decorative purposes, or they may be spun into filaments or formed into artificial bristles.

The resins described herein are tougher and more flexible than the original polyether resins from which they are derived, yet they are soluble to substantially the same extent (unless excessively polymerized) in the same solvents as are the original resins. These advantages are obtained without sacrificing the desirable properties of the original polyether resins, i. e., durability, chemical inertness, and resistance to light.

As many apparently widely different embodiments of this invention may be made without departing from the spirit and scope thereof, it is to be understood that I do not limit myself to the specific embodiments thereof except as defined in the appended claims.

I claim:

1. A process which comprises reacting a polyether resin with an organic compound containing a plurality of halogen atoms attached to different carbon atoms which are in turn attached to an ether oxygen atom.

2. A process for treating a polyether resin and forming therefrom a soluble resinous product of increased toughness and flexibility, said process comprising heating, until such resinous product has formed, said polyether resin with a small amount of an organic polyhalide whose halogen atoms are attached to different carbon atoms which are in turn attached to an ether oxygen atom.

3. The process set forth in claim 2 in which said organic compound is present in an amount of substantially about 1% by weight of the polyether resin.

4. The process set forth in claim 2 in which said organic compound is 2,3-dichloro-1,4-dioxane.

5. A resinous product comprising the reaction product of a polyether resin and an organic compound containing a plurality of halogen atoms attached to different carbon atoms which are in turn attached to an ether oxygen atom.

6. A resinous product comprising the reaction product of a polyether resin and a small amount of an organic compound containing a plurality of halogen atoms attached to different carbon atoms which are in turn attached to an ether oxygen atom, said polyether resin being the reaction product of a substantially unpolymerizable polyhydric phenol and an organic polyhalide, said resinous product being soluble in organic solvents and of greater toughness and flexibility than the polyether resin from which it is formed.

7. The resinous reaction product of a polyether resin and a polyhalogen ether containing at least two halogen atoms attached to different carbon atoms which are in turn joined to different ether oxygen atoms.

8. The resinous reaction product set forth in claim 7 in which said polyhalogen ether is 2,3-dichloro-1,4-dioxane.

GEORGE DE WITT GRAVES.